(No Model.)
F. W. BROWN.
CAR FENDER.
No. 509,996. Patented Dec. 5, 1893.
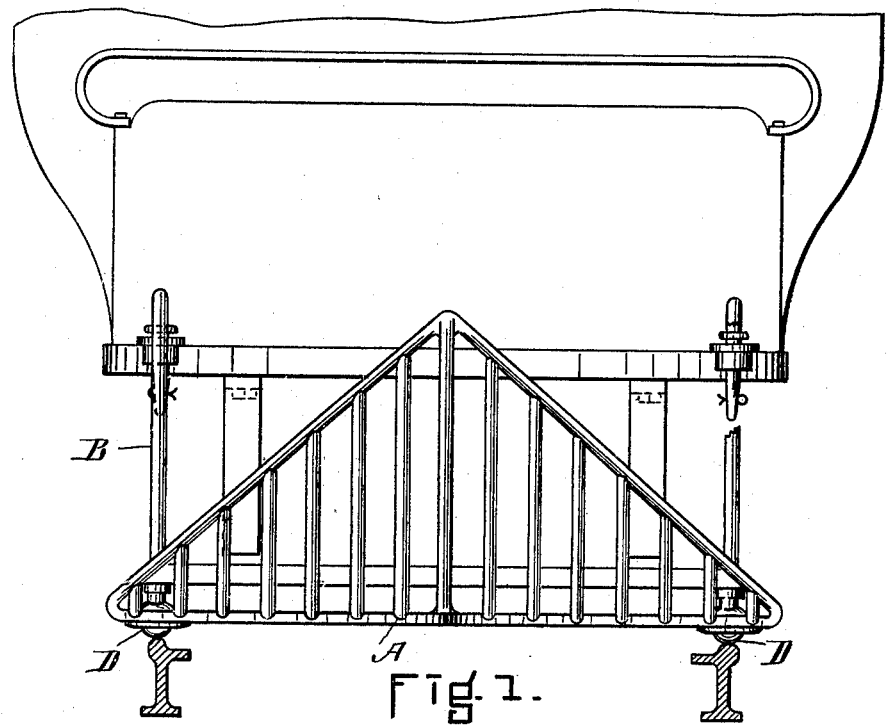
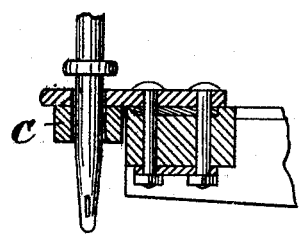
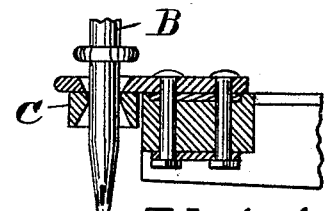
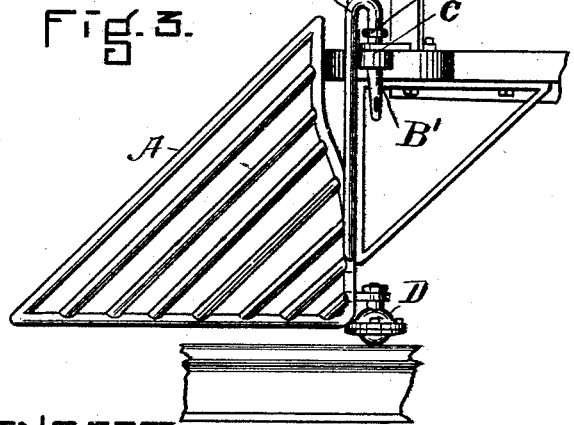
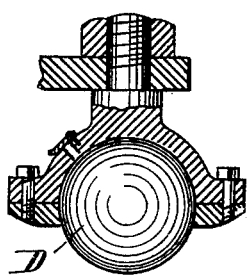
WITNESSES.
Ashton Hastings
Ellen B. Tomlinson
INVENTOR.
Frederick W. Brown
by Alex. P. Browne,
attorney.

UNITED STATES PATENT OFFICE.

FREDERICK WILLIAM BROWN, OF CAMBRIDGE, MASSACHUSETTS.

CAR-FENDER.

SPECIFICATION forming part of Letters Patent No. 509,996, dated December 5, 1893.

Application filed March 28, 1892. Serial No. 426,637. (No model.)

*To all whom it may concern:*

Be it known that I, FREDERICK WILLIAM BROWN, a citizen of the United States, residing at Cambridge, in the county of Middlesex and State of Massachusetts, have invented certain new and useful Improvements in Car-Fenders, of which the following is a specification.

My invention relates to safety fenders for use in front of electric cars or other power propelled vehicles. Its object is to furnish a device whereby the bodies of persons or other objects, when overtaken by the vehicle, shall be prevented from being run over by the same.

My improvement is particularly adapted to furnish a car fender which may be readily removed from the car when desired and which may be so flexibly connected to the car body as not to be disturbed in its operation by the rising or falling of the end thereof through its spring or other motion.

In the accompanying drawings, in Figure 1, I show an end view of my improved device when attached to the car, and at Fig. 2 a side view of the same. Figs. 3, 4 and 5 are detail views of portions of the apparatus as will be hereinafter more fully explained.

My improved device consists of a shield or fender A, preferably of the form and construction of a locomotive cow-catcher, as shown, detachably connectible to the front of the vehicle to which it is applied. As a convenient means of accomplishing this result, I provide it with hooks B having a straight portion B', adapted to enter sockets C suitably disposed upon the front of the car, said straight portion being provided with a stop B². The fit between these hooks and their sockets may be loose enough, as shown at Fig. 3, to allow one to play by the other freely. The fender is supported upon the surface of the track or way by anti-friction bearings D, D, preferably constructed with a caster or universal socket joint as represented in Fig. 5. As it is desirable that the tipping or tilting motion of the end of the car shall not be imparted to the fender, I may cut away the walls of the sockets C as shown at Fig. 4, so as to form a socket of hour glass shape having a suitably close bearing for the pin, but so formed as to permit free horizontal tipping of the parts without lifting, tilting or straining the fender.

While the ball and socket form of anti-friction bearing is not essential to all the advantages of my improvement, yet I consider it desirable because of its yielding readily to allow the fender to travel around curves.

I am aware that fenders have been detachably connected with vehicles by a king pin or the like and provided with wheels adapted to run on a track and such devices are not of my invention, which is characterized by a moving support having a universal joint connection with the fender and by a connection of the latter with a vehicle that permits every ordinary lateral movement of the latter to be made independently of the fender.

I am aware that a track clearer connected by hooks with a car and partially supported by set screws and having fixed arms to run in a gripper slot of a conduit is not new, and such device is not of my invention.

I claim—

1. In combination a vehicle having sockets, a car fender having wheels or the like adapted to run on a track and provided with hooks entering said sockets the latter being specially enlarged in diameter to provide a loose connection with the vehicle whereby the latter can be swayed or tipped laterally without tilting the fender substantially as set forth.

2. In combination a vehicle, having sockets cut away in the form of an hour glass, frictional devices adapted to run on a track and hooks provided with straight vertically disposed portions to enter said sockets and adapted to fit the contracted portion thereof without interfering with the independent lateral movement of the vehicle, substantially as set forth.

3. The combination of a vehicle provided with sockets, a car fender having hooks adapted to enter said sockets forming the sole connection of the vehicle and fender, said sockets being specially enlarged to provide a connection between the vehicle and fender that will permit the former to rock without tilting the latter, and fender supports adapted to run on a track each provided with a universal joint connection with said fender substantially as set forth.

In testimony whereof I have hereunto subscribed my name this 26th day of March, A. D. 1892.

FREDERICK WILLIAM BROWN.

Witnesses:
FRANK G. PARKER,
ELLEN B. TOMLINSON.